Patented Apr. 10, 1928.

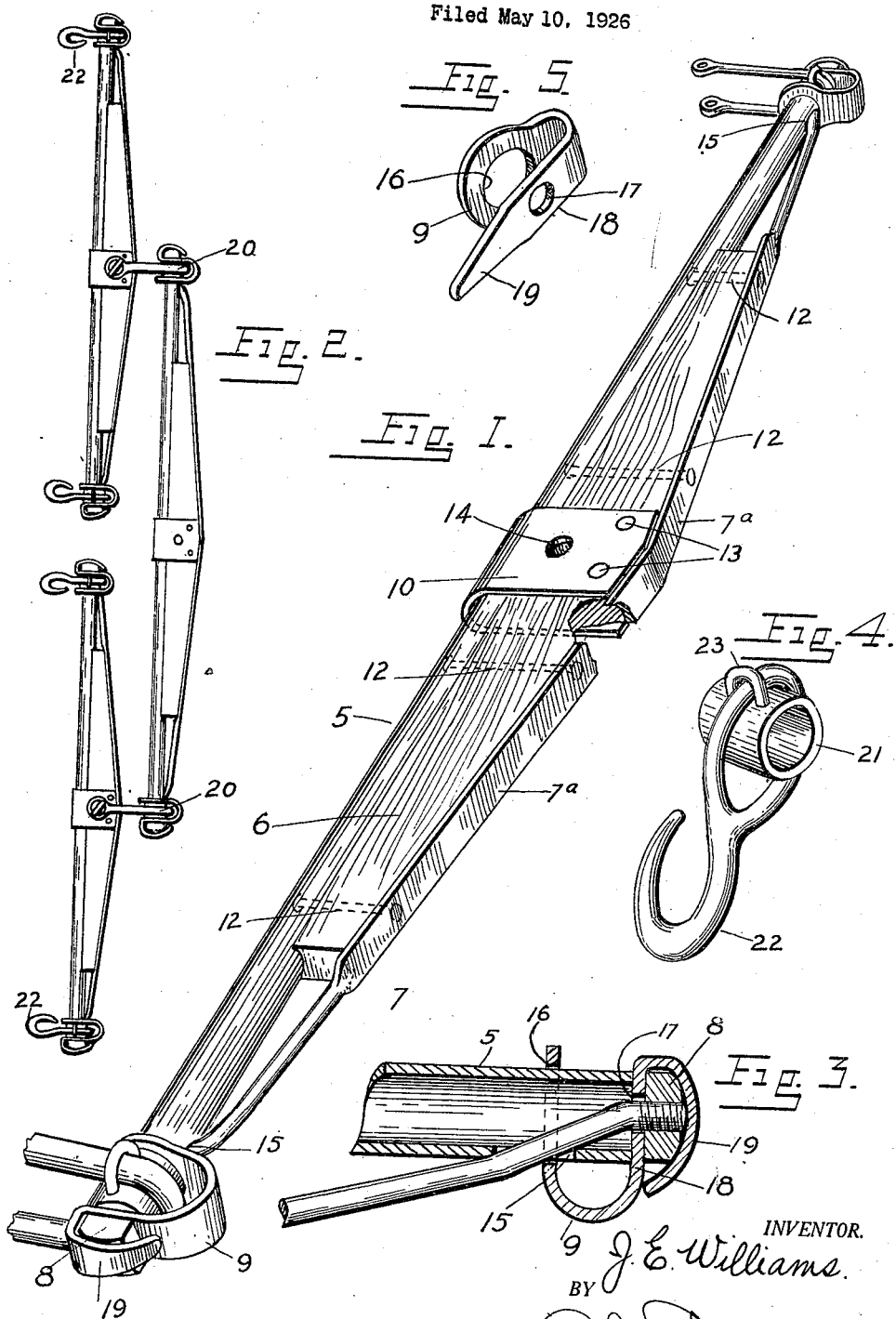

1,665,244

UNITED STATES PATENT OFFICE.

JAMES E. WILLIAMS, OF DENVER, COLORADO.

WHIFFLETREE.

Application filed May 10, 1926. Serial No. 108,069.

My invention relates to draft appliances generally known as whiffletrees and its principal object is to provide an appliance of this kind, adapted for use as either a single tree or a double tree, in which simplicity of construction is combined with strength, durability and practicability in use.

Other objects relating to details of construction and a novel arrangement of parts will fully appear in the course of the following description made with reference to the accompanying drawing.

In the drawing in the several views of which like parts are similarly designated, Figure 1 represents a perspective view of a whiffle tree constructed in accordance with my invention;

Figure 2 an assemblage of a double tree and single trees each made according to the construction illustrated in Figure 1, drawn to a reduced scale;

Figure 3 an enlarged section taken longitudinally through an end of the whiffletree;

Figure 4, an enlarged perspective view of a collar used in connection with the double-tree; and Figure 5, a perspective view of one of the guard pieces applied at the ends of the whiffle tree and constituting a distinctive feature of my invention.

Referring further to the drawing, my improved whiffle tree comprises a tubular bar 5, a brace-block 6, preferably made of wood, extending longitudinally of the bar and centrally between the ends thereof, a truss-rod 7 engaging the outer edge of the brace-block and projecting through and beyond the ends of the hollow bar, nuts 8 on the threaded extremities of the truss-rod, bearing upon the ends of the main bar, guard pieces 9 applied at the ends of the bar and secured by the nuts, and a reinforcing piece 10 embracing the bar and the brace-block at the middle portion of the device.

The brace block is concaved at one edge to provide a seat for the tubular bar, the portion 7ª of the truss-rod engaging the opposite edge of the block, is flattened and the bar, the block and the rod are secured together by rivets 12. The reinforcing member 10 is of U-shape and embraces the middle portion of the bar and the brace block. The member 10 is fastened on the block by means of rivets 13 and it has in its two legs, apertures 14 in alinement with a hole in the brace block for the application of a ring or clevis to attach the double tree to a tongue of a vehicle or a beam of a plow or other implement, or to secure the single trees at the ends of the double tree. The ends of the truss-rod extend through apertures 15 in the end portions of the bar to project through and beyond the open ends thereof, and the extremities of the rod are threaded for the application of the nuts 8.

The guard-pieces 9 applied at the ends of the bar, are composed of U-shaped plates, having in their substantially parallel members, an opening 16 for the insertion of the bar 5, and a therewith axially alined smaller opening 17 for the passage of the rod 7. The part 18 of the guard-piece having the smaller opening, lies flat against the end of the bar and serves as a washer to be engaged by the nut screwed upon the end of the truss-rod to fasten the guard in place. The parts 18 may be provided with extensions 19 which after the nuts have been screwed upon the ends of the rod 7, may be bent to cover the nuts for the purpose of locking them in place and of preventing their sharp edges from injuring persons and animals, or damaging buildings and other structures.

Rings or clevises 20 applied to the ends of the double tree between the legs of the guard pieces, secure the single trees by being inserted through the central holes of the reinforced brace-blocks thereof, and when the device is used as a single tree, collars 21 equipped with hooks 22 for attachment of the traces, are placed around the portions of the bar between the legs of the guard pieces. The hooks may be held against excessive lateral displacement by staples 23, fastened to the collars as shown in Figure 4.

Having thus described my invention, it will be apparent that the elements of which it is composed, cooperate to provide a rigid and strong structure well adapted to withstand the most severe stresses. The reinforcing member 10 prevents the strains from being entirely directed to and borne by the truss-rod and it furthermore provides metal bearing surfaces for the clevises or other devices applied to the central opening of the brace-block. The guards at the ends of the tubular bar, prevent displacement of the rings, clevises or other devices by means of which the traces are fastened to the single trees, or the single trees to the double tree; they also provide washers for the nuts on the ends of the truss-rod, and by extension of their outer portions they furthermore provide a lock and a protective cover for the respective nuts.

What I claim and desire to secure by Letters Patent is:

1. A whiffle tree comprising a hollow bar apertured adjacent its ends, a brace-block engaging the bar, a truss-rod engaging the brace-block and extending through the apertures and the ends of the bar, the bar, the block and the truss-rod being fastened together and the block having a central opening, nuts on the ends of the truss-rod, and U-shaped guard-pieces secured by the nuts and having alined openings to receive the end portions of the bar and the rod, the outer legs of the guard-pieces being extended and bent over the respective nuts.

2. A whiffle tree comprising a hollow bar apertured adjacent its ends, a brace-block engaging the bar, a truss-rod engaging the brace-block and extending through the apertures and the ends of the bar, the bar, the block and the truss-rod being fastened together and the block having a central opening, nuts on the ends of the truss-rod, and U-shaped guard-pieces secured by the nuts and having alined openings to receive the end-portions of the bar and the rod, movable collars on the ends of the bar between the legs of the guard-pieces, and fastening devices carried by the collars.

3. A whiffle tree comprising a hollow bar apertured adjacent its ends, a brace block engaging the bar, a truss rod engaging the brace block and extending through the apertures and the ends of the bar, the bar, the block and the truss rod being fastened together and the block having a central opening, nuts on the ends of the truss rod, U-shaped guard pieces secured by the nuts and having alined openings to receive the end portions of the bar and the rod, and fastening devices movably embracing the ends of the bar between the legs of the guard pieces.

In testimony whereof I have hereunto affixed my signature.

JAMES E. WILLIAMS.